Patented Apr. 22, 1930

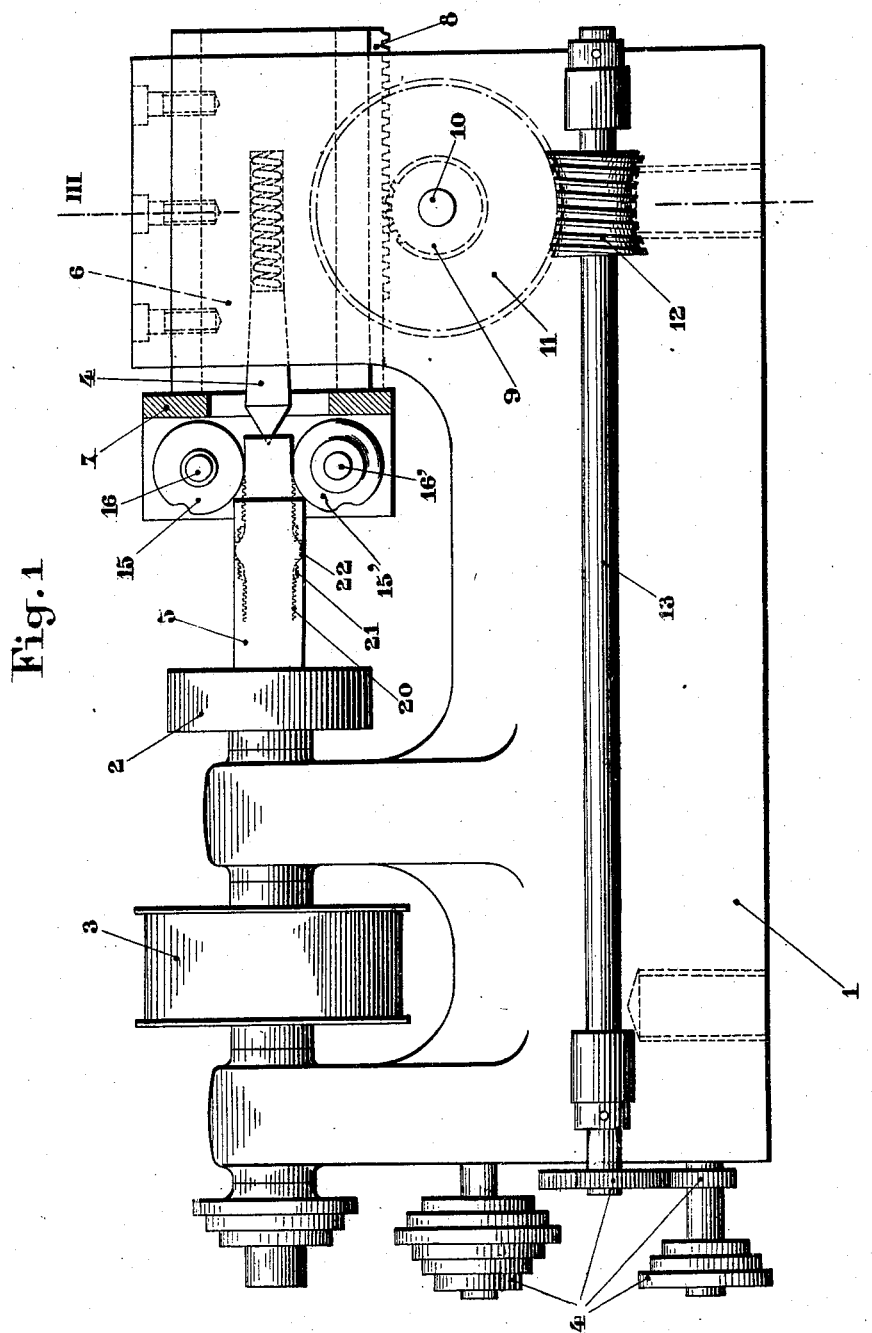

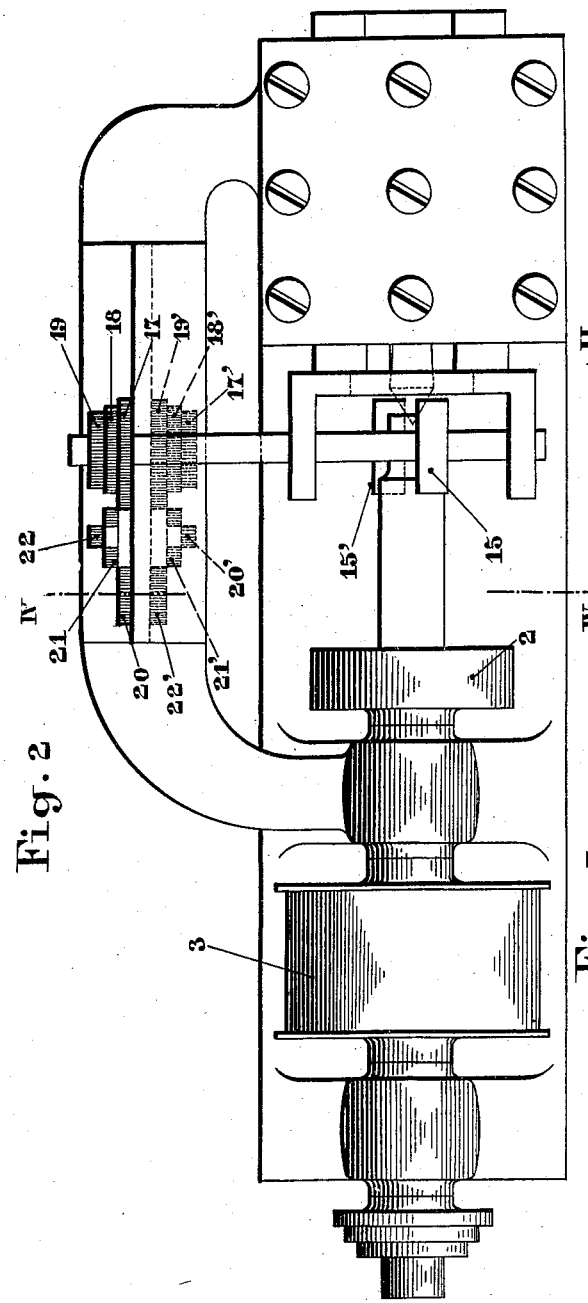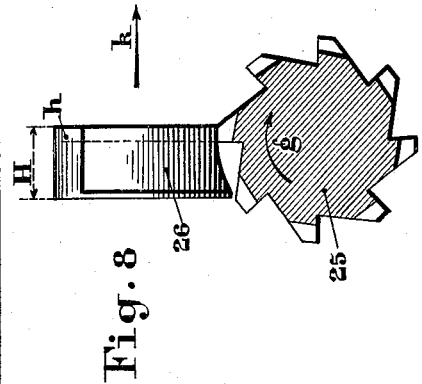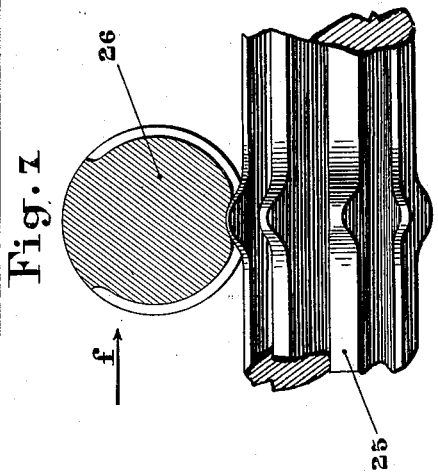

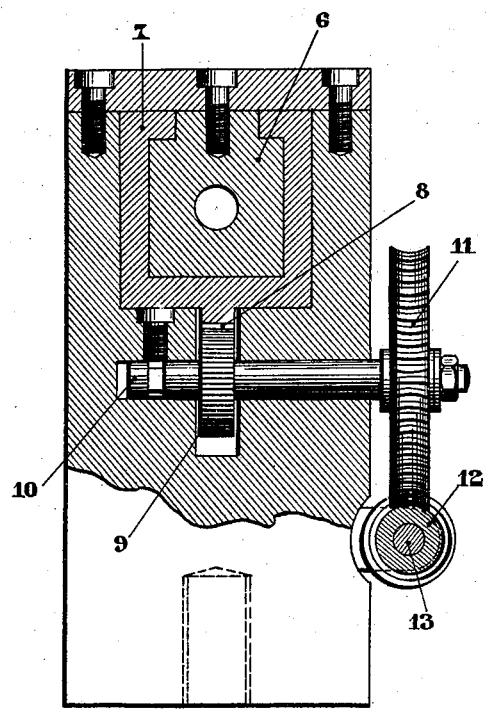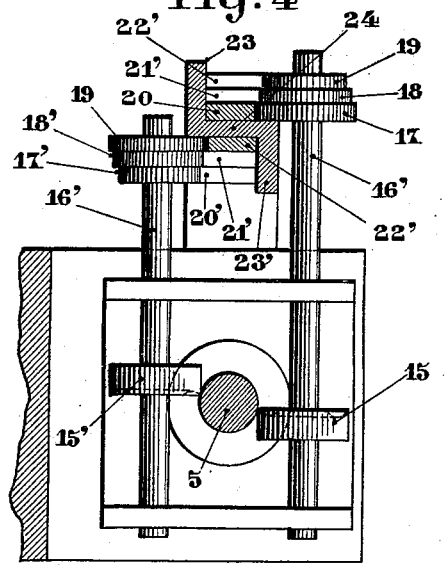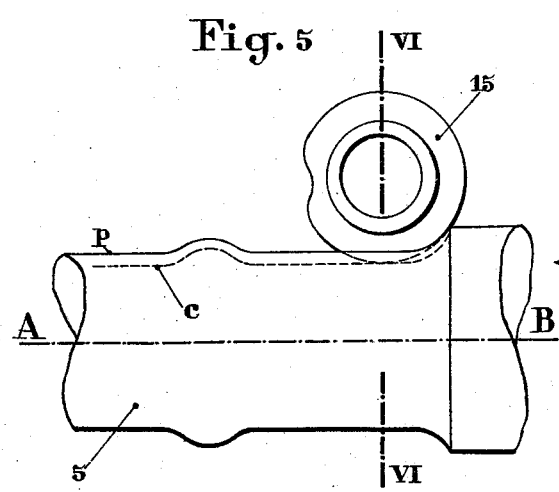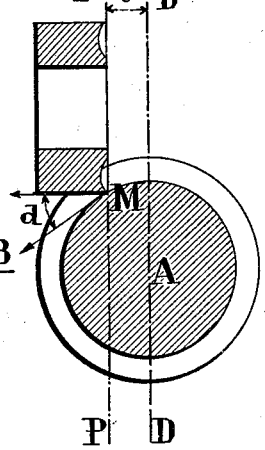

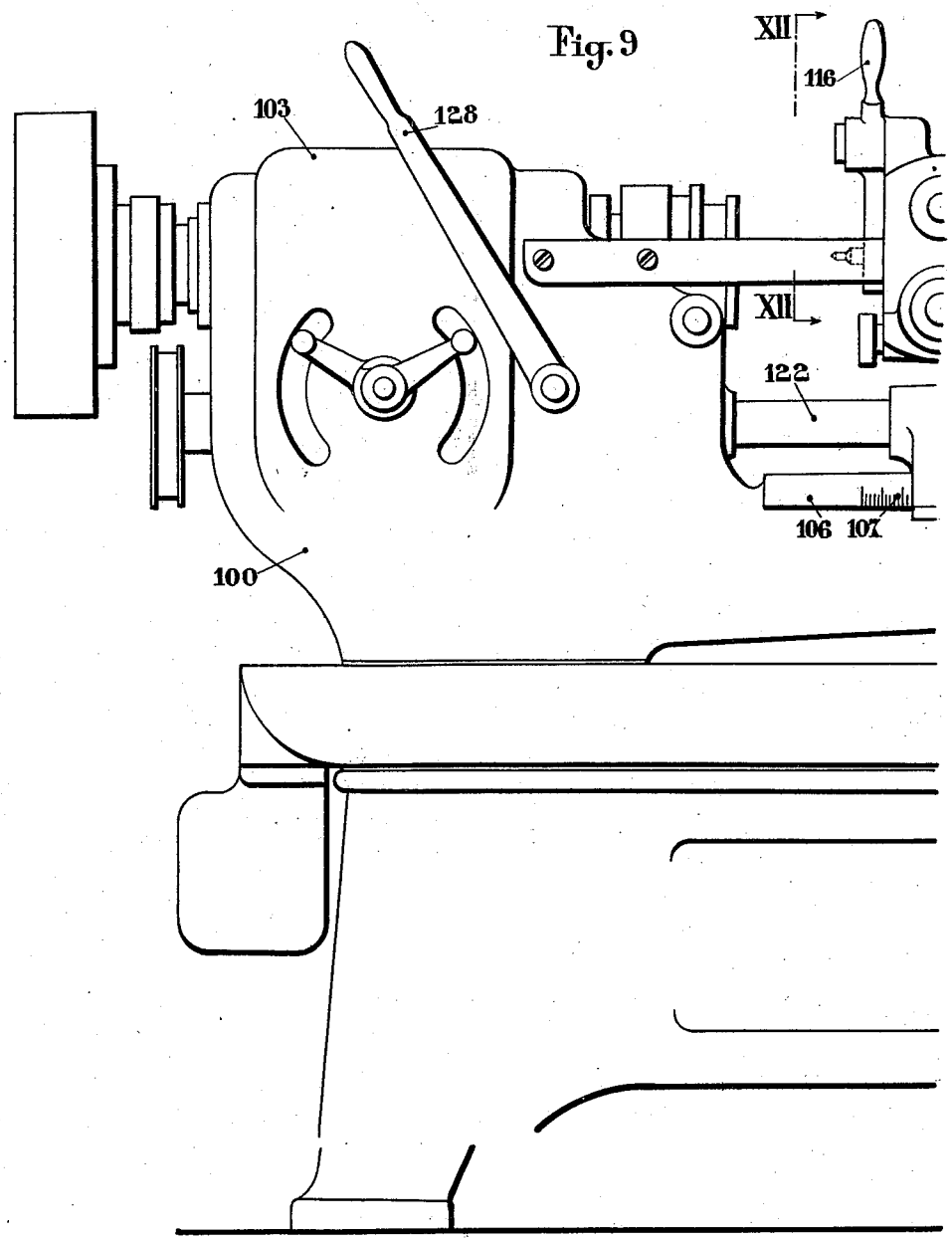

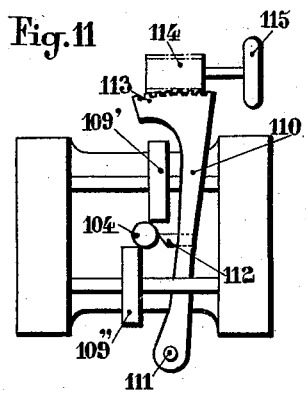
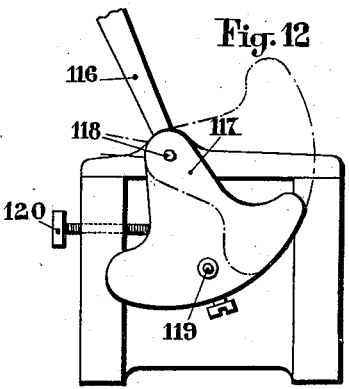
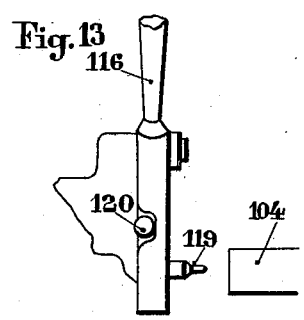
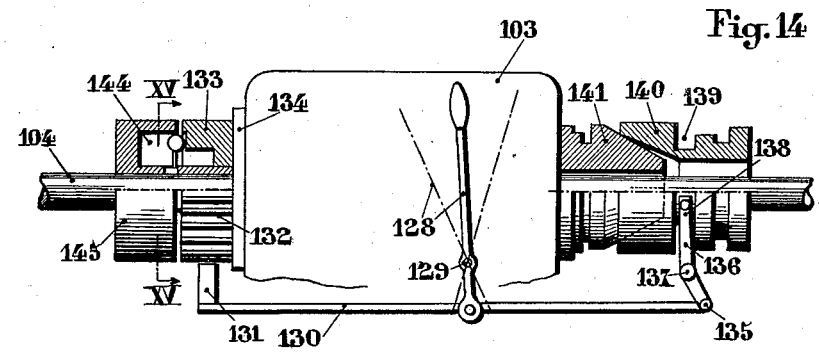
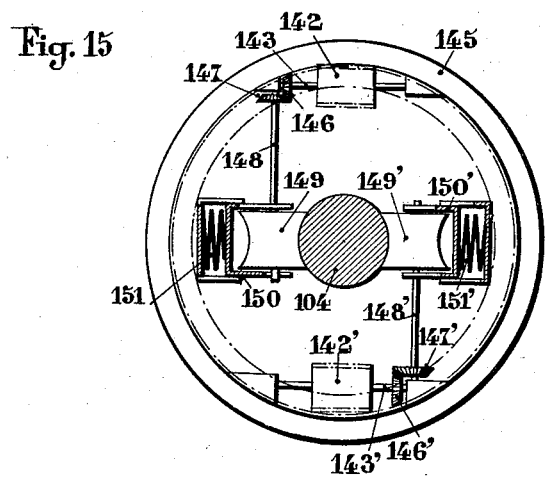

1,755,860

UNITED STATES PATENT OFFICE

ADRIEN BARBA, OF ASNIERES, SEINE, FRANCE, ASSIGNOR, BY MESNE ASSIGNMENTS, TO AUDOIN D'HALLOY, OF PARIS, FRANCE

SHAPING MACHINE

Application filed May 6, 1927, Serial No. 189,399, and in France May 11, 1926.

The present invention has for its object a method and lathe for obtaining under extremely simple conditions, bodies of rotation having any suitable generating line of shape and relates to that type of machine in which a profiled tool is rolled in a direction parallel to the work axis to generate a corresponding profile on a rotating working-piece.

According to the present invention there is imparted to the tool either a uniform straight-line movement, parallel to the axis of rotation of the work and a movement of rotation at a variable speed about its axis proper, the variation in the speed in question being a function of the outline to be obtained; of a uniform movement of rotation about its axis proper and a suitable variable straight-line movement parallel to the axis of rotation of the work, the variation of the latter straight-line movement being a function of the shape to be obtained.

On the same shaft as the tool there are mounted a number of pinions of different radius, the largest and smallest pinions having respectively a radius equal to the maximum and minimum radial distance of points on the cutting edge of the tool from the axis of said tool, whilst the remaining pinions have radii intermediate this maximum and minimum.

On the frame-work of the apparatus there are also secured racks adapted to gear with the said pinions. These racks are arranged parallel to one another and one after the other in such a manner as to be engaged by the corresponding pinion during the movement of the carriage in order to impart the required rotary movement to the tool.

For producing tools corresponding to the different outlines to be obtained a master tool corresponding with the object to be subsequently obtained by the tools, is mounted in the lathe in the place of the work, so as to operate upon a block and form the tool therefrom. The master tool constitutes a kind of milling cutter having for its outline the curve which will be the outline of the cutting edge of the tool during its subsequent movements, that is to say, having for its outline the section of the work to be obtained through a plane in which moves the cutting edge in question. The master tool receives a rapid rotary movement and operates upon a mass of steel to which are imparted the same movements as will be subsequently imparted thereto when it is operated as a tool.

In the accompanying drawings are illustrated by way of example and diametrically one form of construction in accordance with the invention.

In this drawing—

Figure 1 illustrates an elevation, partly cut away, of the shaping machine in question.

Figure 2 shows a plan view.

Figure 3 shows a section on the line III—III of Figure 1.

Figure 4 illustrates a section on the line IV—IV of Figure 2.

Figure 5, illustrates to a larger scale, an elevation showing how the tool acts upon the material to be machined.

Figure 6 illustrates a section on the line VI—VI of Figure 5.

Figure 7 also illustrates, to a larger scale, an elevation showing how the master tool is constructed and how it acts on the mass of steel in which is cut the tool to be machined.

Figure 8 illustrates in end view the device shown in Figure 7, the observer being assumed to be at the left hand of this latter figure.

Figure 9A:
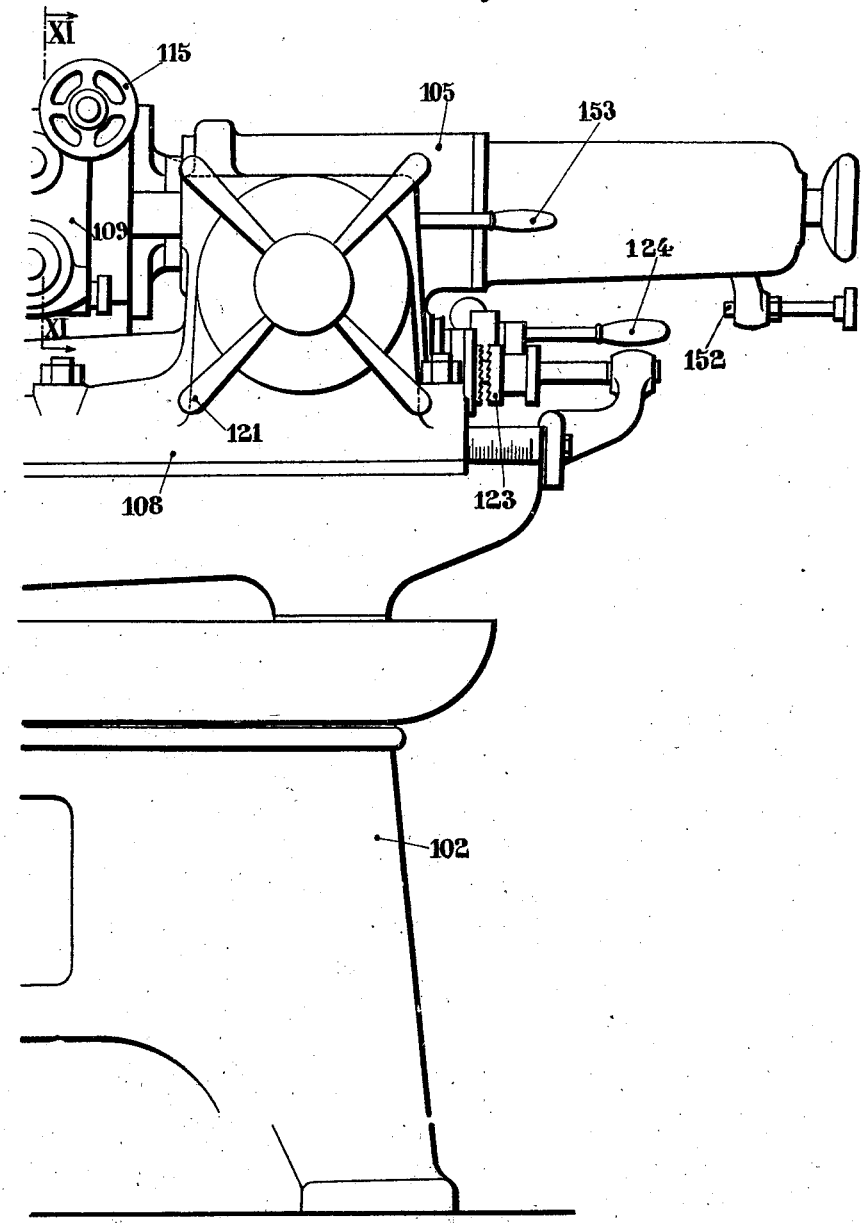

Figures 9 and 9ª illustrate in elevation a complete view of the apparatus constructed for the purpose of effecting continuous operation on a rod.

Figure 10:
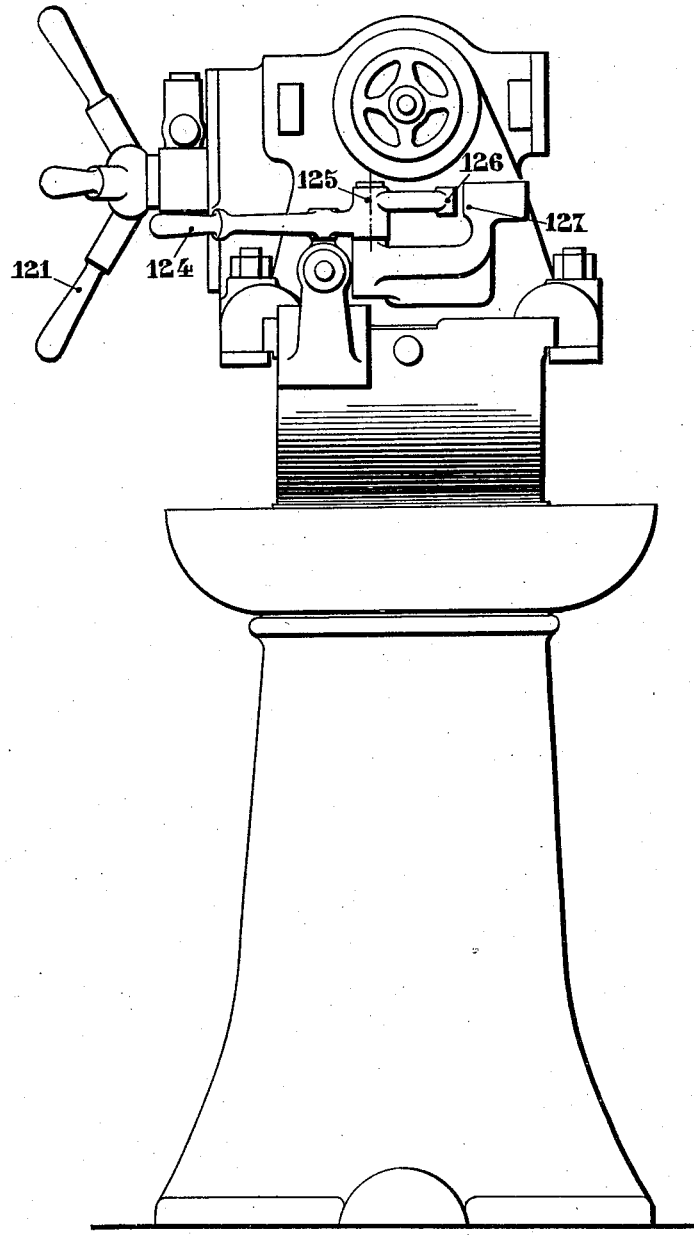

Figure 10 represents an outline elevation, looking from the right hand of Figure 9.

Figure 11 shows a detail view on the line XI—XI of Figure 9, the said view indicating the cone producing device.

Figure 12 shows a view in detail on the line XII—XII of Figure 9, the said view showing the centering device.

Figure 13 illustrates an end view of the device shown in Figure 12.

Figure 14 illustrates an elevation, with a partial diametral section, the fitting device for the rod.

Figure 15 is a view on the line XV—XV of

Figure 14, the said view showing the operating mechanism for moving the rod.

As shown in Figures 1, 2, 3 and 4 the machine consists of a framework 1, similar to the framework of a lathe and on which are mounted a mandrel 2, or a bar chuck, capable of being moved through the medium of a pulley 3, and lathe center device 4 adapted to enable the centering of the material 5 to be worked to be effective.

The lathe center 4 is mounted in a block 6 secured to the framework of the machine and in relation thereto is adapted to slide a carriage 7 capable of being moved, as indicated hereinafter, by a uniform horizontal movement parallel to the axis of the machine.

The uniform horizontal movement in question is imparted to the carriage 7 by means of a rack 8 secured to the carriage and with which engages a pinion 9 keyed to a shaft 10 mounted in the frame of the machine.

The shaft 10 itself receives a rotary movement from the general driving mechanism of the machine and this by means of a worm wheel 11 secured at its end, gearing with a worm 12 on a shaft 13 secured to said worm and a reducing device 14.

On the carriage 7 are mounted two similar tools 15 and 15' secured respectively to shafts 16 and 16' which carry at their other ends, the first toothed pinions 17, 18 and 19 adapted to gear respectively with the racks 20, 21 and 22 disposed parallel to one another and one after the other on one of the wings 23 of an attached member 24 having a section of Z-shape and which is secured to the framework of the machine. The second shaft carries toothed pinions 17', 18' and 19' adapted to gear respectively with racks 20', 21' and 22' disposed in the same manner as the preceding ones but on the blade 23' of the member 24.

The simultaneous operation of the two tools 15 and 15' is not absolutely essential and does not constitute one of the characteristic features of the invention.

The simultaneous use of two tools simply has the known advantage of balancing the efforts.

It will be readily understood that the feed of the carriage 7, with all the pinions 17, 18 and 19 which engage with the rack corresponding thereto, imparts to the shaft and to the tool 15 a rotary movement which causes this to roll on its outline.

The same applies to the tool 15' which is driven by the shaft 16' and by that of the pinions 17', 18' and 19' which are in engagement with this corresponding rack.

It will be understood that the racks 20, 21, and 22, 20', 21' and 22' are adjustable in such a manner that their position may be varied or they may be changed without varying from the manufacture of one series of objects having a given outline in the manufacture of objects having a different outline.

In Fig. 1 there is indicated in dotted lines the outline which the object will have when its machining is completed. This outline corresponds with the curve which has been taken along the right section of the tools.

In Figs. 5, 7 and 8 is shown the manner in which a tool may be formed which subsequently permits of machining objects having a given outline.

When considering the work 5 to be machined, which turns about the axis A' B and of the tool 15, it will be seen that for the purpose of obtaining a satisfactory operating angle $d$, the operating point M has been moved in a plane P P situated at a certain distance from the diametral plane D D of the object.

Consequently the cutting edge of the tool 15 no longer rolls on the outline $p$ of the object but along a curve $c$ which is the line not in section of the plane P P and the object to be machined and that there is obtained a shape different to the shape of the outline $p$.

The difference in shape existing between these two curves is less important the greater the distance $l$ which separates the plane P P from the diametral plane D D.

In order to manufacture a tool corresponding to the outline to be given to the object to be manufactured there is first determined, as a function of the operating angle D which is to be obtained, and consequently as a function of the corresponding distance $l$ between the planes P P and D D, the curve $c$ on which the cutting edge of the tool rolls.

This determination is extremely easy as it deals with a plain section of a surface of revolution through a plane parallel to the axis of this surface.

The curve $c$ having thus been determined there is prepared the master tool 25 in conformity with that illustrated in Figs. 7 and 8 and which constitutes a kind of milling tool of which the cutting edges are exactly of the shape of the curve $c$.

This master tool is mounted on the machine in the place occupied subsequently by the work to be machined and after having set it in rotation in the direction of the arrow $g$ of Fig. 8 there is caused to rotate thereon, in the direction of the arrow $f$ of Fig. 7, the mass of steel 26 into which the tool 15 is adapted to be cut.

The same movements (uniform straight line movement parallel to the axis of the machine and rotary movement at a variable speed about its proper axis) is imparted to the mass of steel 26 as will subsequently be imparted to the tool 15.

For each complete movement of the mass 26 along the master tool 25 there is obtained the machining of a band of a given height $h$ of the cylinder 26 of which the width is H.

After each complete movement or each passage of the mass 26 this latter is moved in the direction of the arrow $k$ of Fig. 8 the quantity equal to $h$.

After a number of movements equal to $\frac{H}{h}$ the tool 15 is finished and ready for use.

It will be clear that the length of the perimeter of the mass of steel 26 in which the tool is cut should be at least equal if not greater than the length of the curve $c$, which itself is a function of the outline of the object to be obtained.

As will be seen in Figs. 9 to 15 and especially in Figs. 9 and 10 the method of application to continuous operation of a rod, indicated above, consists of a main framework 101 resting on a base 102.

In the interior of the left hand portion of this framework at 103 is fixed an operating mechanism which produces the feed, the securing and the rotation of the rod 104 to be machined placed along the axis of the apparatus.

On the right hand side of the framework 101 is disposed the lathe center mechanism 105. Finally on ways 106 provided with a graduated scale 107 is mounted and adapted to move a carriage 108 itself carrying a tool holder head 109, similar, as a whole, to that above described.

On this latter there are also mounted the devices illustrated in detail in Figs. 11, 12 and 13.

The device illustrated in Fig. 11 serves to detach from the rod the elements which the machine has completed.

For this purpose there is secured, in a suitable position, on an arm capable of turning about an axis 111 secured to the tool holder head, a cutting tool 112.

At its upper part the arm 110 carries a toothed sector 113 which gears with a worm 114' which may, by means of a suitable operating wheel 115, produce the rotation in one direction or the other.

It will be readily seen that by turning the wheel 115 in the desired direction the cutting edge of the tool 112 is brought into contact with the rod 104 of which the front portion will be machined by the tools 109' and 109''. In this manner the rod is severed.

Before moving this latter so as to bring it into position which enables the machining of the subsequent element to be proceeded with it is necessary to prepare the end which is cut off in such a manner that this end may bear in a correct manner against the lathe center.

In practice there is provided in the said section a central seating with which the centre point is adapted to engage.

For this purpose, by acting through the medium of a handle 116 on a member 117 which may turn about an axis 118 mounted on the tool holder head, the seating probably may be caused to pass from the position in which it is shown in chain dotted lines in Fig. 12 to the position in which it is shown in full lines in the same figure.

The member 117 in question being provided with a centering drill, suitably disposed, the feeding of the seat of the centre point is effected automatically during the rotation of the rod when the drill has been brought into contact with the end of this latter.

A stud screw 120 permits of adjusting in a precise manner the position to be occupied by the drill 119 when the member 117 is caused to move from the position in which it is illustrated in chain dotted lines to the position in which it is illustrated in full lines.

Once the seating of the centre point has been effected it will be understood that by means of the handle 116 the member 117 is withdrawn from the position in which it is shown in full lines in Fig. 12 into the position in which it is shown in chain dotted lines in the same Figure.

The movements which it is necessary to impart to the carriage 108, especially for bringing the centering drill into contact with the end of the rod are obtained by acting on an operating hand wheel with four arms 121.

For machining the automatic movements of the carriage 108 and the consecutive movements of the tools are produced through the medium of a shaft 122 disposed between the carriage and the operating gears enclosed in the part 103 of the framework.

On the said shaft 122 is provided a clutching and declutching device 123 operated by a lever 124 turning about an axis 125 and provided with a finger 126 which, when acting on the lever, moves relatively to a kind of catch 127 adapted to lock the lever in accordance with the case corresponding either with the position corresponding with clutching or with the position corresponding with declutching.

As will be seen in Fig. 14 the device for feeding, fixing and driving the rod is mounted in the part 103 of the framework and is operated by means of the lever 128 movable about the axis 129 secured to the said framework and acting on element 103.

This latter carries at its ends a finger 131 adapted to penetrate when the left hand end of the crank 130 is moved upwardly, into the grooves 132 of a plate 133 mounted on the rotary plate 134 along the axis of which passes the rod 104 to be machined.

At its other end the crank 130 is hinged at 135 to a lever 136 movable about its stationary axis 137 and of which the end 135 actuated, for example, in the manner of the clutch operating forks, penetrates into the annular groove 135 of a member 140 of which the interior is cut in the form of a female cone. This member 140 is adapted, when it is moved towards the left of the figure, to produce tightening on the rod 104 of the jaws of a male cone 141.

On the contrary when this member is moved towards the right it disengages the jaws of the male cone 141 and releases the rod which is then capable of being freely moved.

The feed of the rod is produced by means of the operating lever 128 through the medium of the crank 130 of the finger 131 of the notch plate 133.

This latter is loosely mounted on the sleeve 134 and carries on its left hand side teeth which engage with worms 142—142', mounted on the axes 143 143' situated in the interior of a bearing 144 reserved in the interior of a plate 145 solid with the sleeve 134.

On the axes there are also secured bevelled pinions 146 146' which gear respectively with beveled pinions 147 147' themselves keyed to axes 148 148' which carry, at their end, driving rollers 149 149' provided in casings 150 150' and held, by suitable tension springs 151 151', in contact with the rod 104.

As long as the plate 133 is free to follow the movement of the plate 134 and of the plate 145 and turn with these latter, no movement is produced in the device described.

All the members turn as a unit.

When the finger 131, which is disposed at the left hand end of the crank 130, enters one of the notches 132 of the plate 133 it stops this latter.

The worms 142 142' which continue to be driven by the plate 145 commence, by reason of the action of the teeth of the plate 133, to turn driving the bevelled pinions 146 146' which are keyed to their shaft.

The said pinions 146 146' driving in turn the pinions 147 147' and the movement of rotation is transmitted to the rollers 149 149' which, by friction, cause the rod 104 to move parallel to its axis.

The movement of the rod 104 continues until the moment when the end of this latter comes into contact with the centre point.

For returning the machine to the desired position for again effecting the machining operation it suffices to act on the lever 128 in such a manner as to disengage the finger 131 from the notches 132 of the plate 133 and to bring the female cone into engagement with the male cone 141 in such a manner as to produce locking on the rod of the jaws of the latter and to lock the rod which again is driven by the sleeve 134.

All the devices above described are completed by the provision on the framework 101 of an automatic disengaging stop 152 which is movable and adjustable and adapted to stop the movement of the carriage 108 and the action of the milling tools carried by this carriage when the machining of an element of the rod has been completed.

The complete cycle of operations for the treatment of an element of the rod is the following.

The machine being in running order and the automatic disengaging stop being correctly set one commences by withdrawing the drill holder for centering by acting upon the lever 116. The rod is mounted in the apparatus and its end is brought into contact with the drill holder and the centering is effected by moving the carriage very slightly and producing the movement through means of a lever with four arms 121.

The carriage is then returned to the end towards the right of Figure 9 in order to be able, by acting on the lever 116, to disengage the centering drill and to move it in the position illustrated in chain dotted lines in Figure 14.

By acting on the lever 128 in order to cause the rod to advance into contact with the centre point then by moving the lever 128 in the opposite direction the feed movement of the rod is stopped and the jaws of the locking cone are locked.

The rod having thus been brought into the position for machining the carriage 108 is set in operation as also the tool holder head by means of the declutching lever 124.

The machining is effected automatically until the stop 152 automatically comes into action when once the machining has been completed so as to stop the movement of the carriage 108 and the tools.

The conical mechanism is then operated by acting upon the hand wheel 115 which produces the cutting of the rod by means of the tool 112.

Once the rod has been separated the object which has been manufactured is removed and the cycle of operations indicated above is repeated.

A supplementary declutching lever 153 enables the driving mechanism for the chariot to be declutched when it is moved by means of the operating lever with four arms 121.

As described above the machine which forms the subject of the invention constitutes a new industrial product capable of rendering the most appreciable services in industry.

It will be understood that the range of the invention is not limited in any respect to the form of construction which has been illustrated diagrammatically and that this may be modified in its details of construction and may be completed by any useful accessory device without for this purpose departing from the scope of the invention.

Having thus described my invention, what I claim as new and desire to secure by Letters Patent is:—

1. The method of making turned objects comprising rotating the work piece and traversing it in a plane parallel to its axis of rotation with a cutter rotating on an axis perpendicular to the axis of the work piece, the shape of whose peripheral cutting edge and the speed at which said cutter rotates are corelative functions determining a path which successive edge-points of the cutter describe in the course of its rotation coincident with an element of curvature of the form to be produced lying in a plane not coincident with the diametrical plane through said turned object.

2. The method of making turned objects comprising rotating the work piece and traversing it at variable speed in a plane parallel to its axis of rotation with a cutter rotating on an axis perpendicular to the axis of the work piece, the shape of whose peripheral cutting edge and the speed at which said cutter rotates are co-relative functions determining a path which successive edge-points of the cutter describe in the course of its rotation coincident with an element of curvature of the form to be produced lying in a plane not coincident with the diametrical plane through said turned object.

3. The method of making a cutting tool for carrying out the process of claim 1 comprising forming on a milling cutter, a cutting edge which corresponds with an element of curvature of the form to be produced in a plane parallel to but not coincident with the diametrical plane, and, rotating a tool blank longitudinally of the edge of said milling cutter at a speed equal to the subsequent relative speeds between said tool and work piece, in the production of the turned shape.

4. Apparatus for producing turned objects comprising a rotary work piece holder and a tool rotatably mounted on an axis perpendicular to the axis of said work piece holder, and mounted to coact with said work piece by relatively longitudinal movements in a plane parallel to the plane of the axis of rotation of said work piece but out of coincidence therewith, means for rotating said tool on an axis perpendicular to that of said work piece so as to bring each of the points of the peripheral edge thereof successively into cutting relation with said work piece, the shape of said peripheral edge and the relative speed with which said parts are driven being corelative functions of the element of curvature developed in the rotation of said tool.

5. Apparatus for producing turned objects comprising a rotary work piece holder and a tool cooperating therewith, driving means for imparting relative translatory movement of said tool longitudinally of the axis of said work piece and in a plane parallel to but non-coincident with the axial plane of said work piece and means for imparting rotary motion to said tool on an axis perpendicular to the axis of said work piece, one of said motions being uniform and the other variable, said tool having a cutting edge on its periphery coacting with said work piece and shaped to produce an element of curvature, the shape of which is determined by the corelative functions of the peripheral shape of the tool and the rates of movements imparted to it by said driving means.

6. Apparatus for producing turned objects, comprising a rotary work piece holder and a tool cooperating therewith, driving means for imparting relative translatory movement of said tool longitudinally of the axis of said work piece holder and in a plane parallel to, but non-coincident with the axial plane of said work piece holder, said means comprising a series of pinions of different diameters operatively connected to one of said relative movable elements, and racks meshing with said pinions and selectively operable for varying the speed of said relative movement, and means for imparting rotary motion to said tool on an axis perpendicular to the axis of said work piece holder, said tool having a cutting edge on its periphery coacting with the work piece and shaped to produce an element of curvature, the shape of which is determined by the corelative functions of the peripheral shape of the tool and the rates of movements imparted to it by said driving means.

ADRIEN BARBA.